(12) United States Patent
Wu et al.

(10) Patent No.: US 7,073,008 B2
(45) Date of Patent: Jul. 4, 2006

(54) METHOD OF FUNCTION ACTIVATION ON A BRIDGE SYSTEM

(75) Inventors: Yuan-Ting Wu, Hsin-Chu (TW); Shu-Fang Tsai, Hsin-Chu (TW)

(73) Assignee: Media Tek Inc., Hsin-Chu Hsien (TW)

( * ) Notice: Subject to any disclaimer, the term of this patent is extended or adjusted under 35 U.S.C. 154(b) by 240 days.

(21) Appl. No.: 10/605,195

(22) Filed: Sep. 15, 2003

(65) Prior Publication Data
US 2005/0060478 A1  Mar. 17, 2005

(51) Int. Cl.
G06F 13/36 (2006.01)
(52) U.S. Cl. .................. 710/306; 710/311; 710/312; 710/315
(58) Field of Classification Search ............. 710/100, 710/105, 300–304, 305, 306, 311, 312, 313, 710/315, 316
See application file for complete search history.

(56) References Cited

U.S. PATENT DOCUMENTS

| | | | |
|---|---|---|---|
| 6,035,355 A * | 3/2000 | Kelley et al. | 710/302 |
| 6,170,027 B1 * | 1/2001 | Lu et al. | 710/65 |
| 6,460,106 B1 * | 10/2002 | Stufflebeam | 710/304 |
| 6,516,205 B1 * | 2/2003 | Oguma | 455/557 |
| 2004/0205280 A1 * | 10/2004 | Jeansonne et al. | 710/306 |

* cited by examiner

Primary Examiner—Khanh Dang
(74) Attorney, Agent, or Firm—Winston Hsu

(57) ABSTRACT

A bridge system having at least one bridge chip to control the operations of the bridge. Each bridge chip uniquely connects to a bus interface allowing communications between a host system and the bridge chip when that bus interface is to be utilized. Each bridge chip also connects to another bus interface connecting the bridge with a device. Each bridge chip includes an activation circuit that automatically disables that bridge chip after a power-on or a hardware reset occurs. When the activation circuit receives a protocol initialization signal, the activation circuit causes only the associated bridge chip to become enabled. Once enabled, the bridge chip drives all of the pins in the bus interface connecting the bridge with the device and remains in control of that bus interface until a power-off, a hardware reset occurs, or the bridge chip has been physically disconnected from the host.

20 Claims, 4 Drawing Sheets

METHOD OF FUNCTION ACTIVATION ON A BRIDGE SYSTEM

BACKGROUND OF INVENTION

1. Field of the Invention

The present invention relates to a bridge system. More specifically, an apparatus and method capable of supporting multiple interface types with the same bridge system is disclosed.

2. Description of the Prior Art

The modularization of components for many of todays electronic devices has benefited manufacturers and consumers alike. The consumer has the flexibility to select from a variety of components or add additional hardware according to his or her needs. The manufacturer has the advantages of specialization, reducing costs and increasing performance of the particular component. One quite common example of such an arrangement is the ability of the user to add a device, such as an optical disc drive, to a preexisting host computer system.

As with non-modularized systems, a basic requirement for the proper functionality of the system is establishing a protocol for effective communications between the various components and the host system. Therefore, a variety of industry standard communication protocols have been developed and are currently in use, such as versions of a Universal Serial Bus (USB), Integrated Drive Electronics (IDE), and Small Computer System Interface (SCSI) interfaces as a few examples. As long as the host system and the component utilize the same protocol, communications allowing the proper functioning of the component are possible.

An obvious communication problem occurs when a user wishes to attach a device that uses one protocol to a host system connection using a different protocol, for example connecting an IDE device to a USB port of the host system. In this situation an intermediate device, or bridge, is often used between the device and the host system to permit effective communications. The bridge comprises the necessary circuitry and information to allow proper communications between the host system that utilizes a first communications protocol and the device that utilizes a second communications protocol. Costs and manufacturing concerns often result in one bridge system supporting multiple interface types. For example, one such multiple bridge system may permit connecting an IDE device with a host system utilizing either a USB port or a 1394 interface of the host system.

FIG. 1 is a functional block diagram of a prior art Host-Bridge-Device system 10 that utilizes a multiple bridge. The system 10 comprises a host system 15, a multiple bridge 20, and a device 25. A first bus interface 30 may connect the host system 15 with the multiple bridge 20 and allow communications between the host 15 and the multiple bridge 20 according to a first communications protocol A. A second bus interface 35 may connect the host system 15 with the multiple bridge 20 and allow communications between the host 15 and the multiple bridge 20 according to a second communications protocol B. A third bus interface 40 connects the multiple bridge 20 with the device 25 and allows communications between the multiple bridge 20 and the device 25 according to a third communications protocol C.

Because the multiple bridge 20 connects to only one device 25, to avoid hardware conflicts, activation of only one of either the first bus interface 30 or the second bus interface 35 is permitted at any one time. Therefore, the multiple bridge 20 comprises two bridge chips 50 and 55 to control the operations of bridge 20. Normally the two bridge chips 50 and 55 are disposed on a PCB board also comprised by the bridge 20. The bridge chip 50 is connected to the first bus interface 30 and allows communications between the host system 15 and the device 25 when the first bus interface 30 is to be utilized. The bridge chip 55 is connected to the second bus interface 35 and allows communications between the host system 15 and the device 25 when the second bus interface 35 is to be utilized. Both of the bridge chips 50 and 55 are also connected to the third bus interface 40 to complete the host system 15 to device 25 connections.

There are at least two conventional methods of selecting which one of the two bridge chips and is to be activated and which one of the two bridge chips is to be deactivated. The first method, as shown in FIG. 2, involves an additional function pin on each bridge chip 60 and 65 for enabling/disabling the bridge chips 60 and 65. The input of the functional pin may be similar to a jumper setting 70 and requires being physically set to predetermined locations according to the intended use of the bridge 45 in the multiple bridge system 80.

A second conventional method is shown in FIG. 3. This method is often applied when bridge chips do not have a functional pin for disabling/enabling the bridge chip. The Host-Bridge-Device system 90 shown in FIG. 3 differs from the system 80 of FIG. 2 in that no functional pin placement is used and enabling/disabling of bridge chips 61 and 66 is handled by a control circuit 75. The input of the control circuit 75 may be similar to a jumper setting 71 and requires being physically set to predetermined locations according to the intended use of the bridge 46 in the multiple bridge system 90. When the selected bridge chip 61 or 66 is enabled, the control circuit 75 allows the device bus interface 40 pins to connect to the output pins of the selected bridge chip 61 or 66 and blocks out all the output pins of the unselected bridge chip 61 or 66. The control circuit 75 is external to the bridge chips 61 and 66 but is usually formed on the same PCB as are the bridge chips 61 and 66 of the multiple bridge 46.

Both conventional methods are capable of determining which bridge chip is activated and which is deactivated.

However, a functional pin requires physically altering the bridge system while an inclusion of an arbitration circuit raises the cost, size, and complexity of the bridge system.

SUMMARY OF INVENTION

It is therefore a primary objective of the claimed invention to reduce the cost, size, complexity, and inconvenience of a multiple bridge system by having each bridge chip automatically disabled by default and activating a desired bridge chip only when that bridge chip receives a predetermined protocol initialization signal.

The present invention includes a bridge system having a plurality of bridge chips to control the operations of a bridge. Each bridge chip may be uniquely electrically connected to a bus interface and allow communications between a host system and the bridge chip when that bus interface is to be utilized. Each of the bridge chips may also be connected to another bus interface connecting the bridge with the device to complete the host system to bridge to device connections.

Each bridge chip includes an activation circuit in a one-to-one relationship that automatically disables the bridge chip after a power-on, a hardware reset occurs, or the bridge chip has been physically disconnected from the host.

The activation circuit is capable of enabling that one associated bridge chip when the activation circuit receives a predetermined protocol initialization signal. If the activation circuit receives the predetermined protocol initialization signal, the activation circuit causes the associated bridge chip, and only the associated bridge chip, to become enabled. Once enabled, the bridge chip drives all of the pins in the bus interface connecting the bridge with the device and remains in control of the bus interface connecting the bridge with the device until the bridge system has been physically disconnected from the host, a power-off occurs, or a hardware reset occurs.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
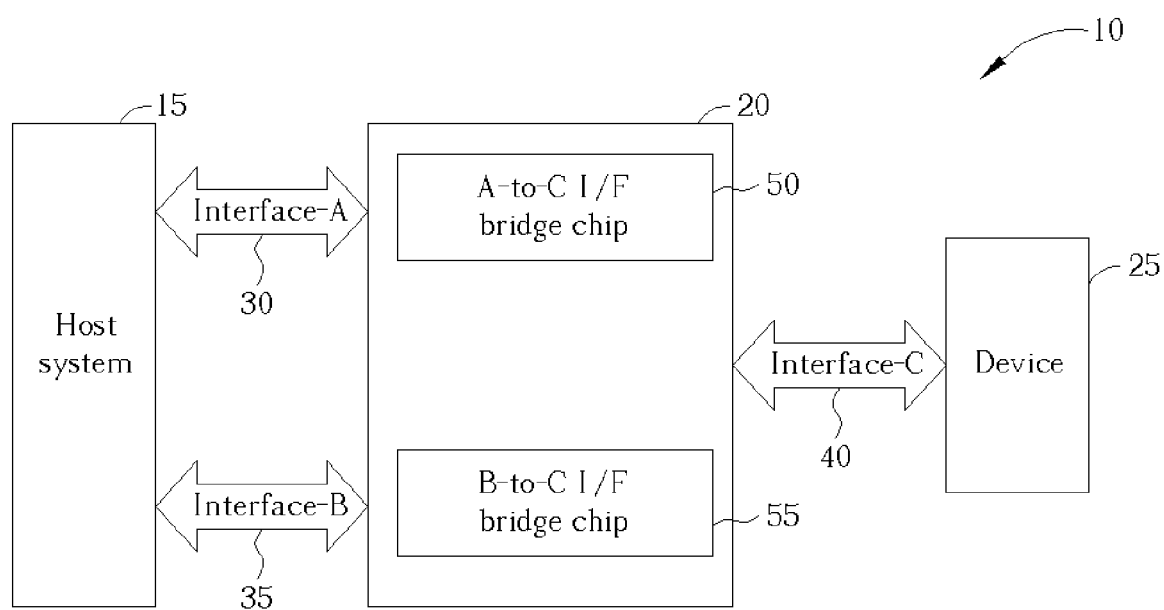
FIG. 1 is a functional block diagram a Host-Bridge-Device system that utilizes a multiple bridge.
Figure 2:
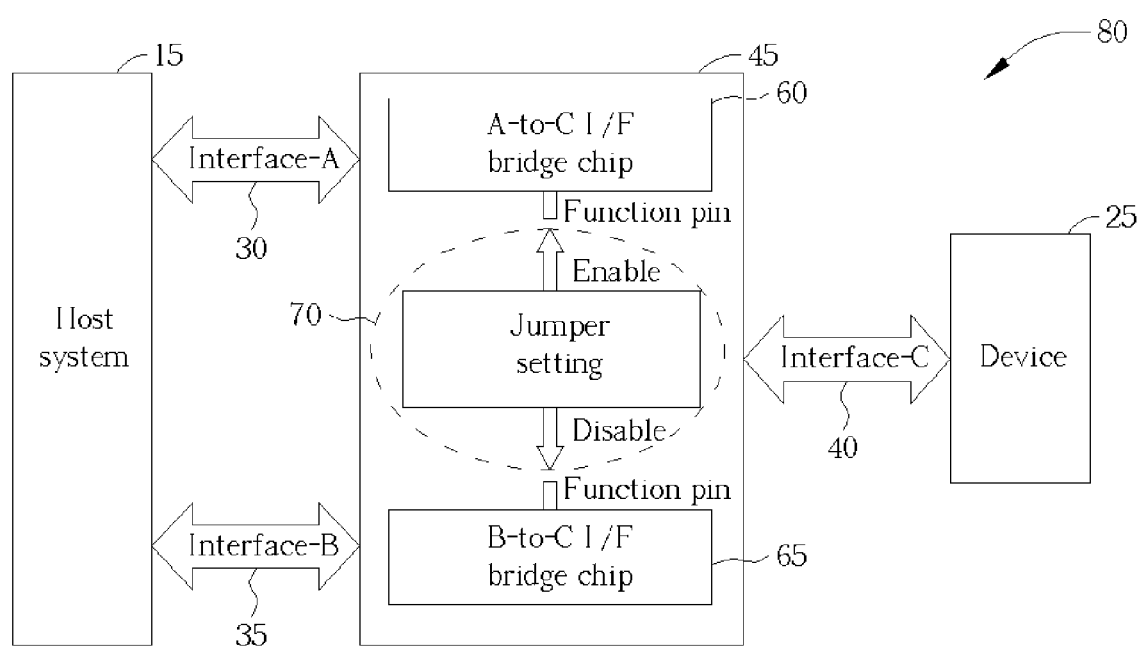
FIG. 2 is a functional block diagram of a conventional Host-Bridge-Device system that utilizes a multiple bridge.
Figure 3:
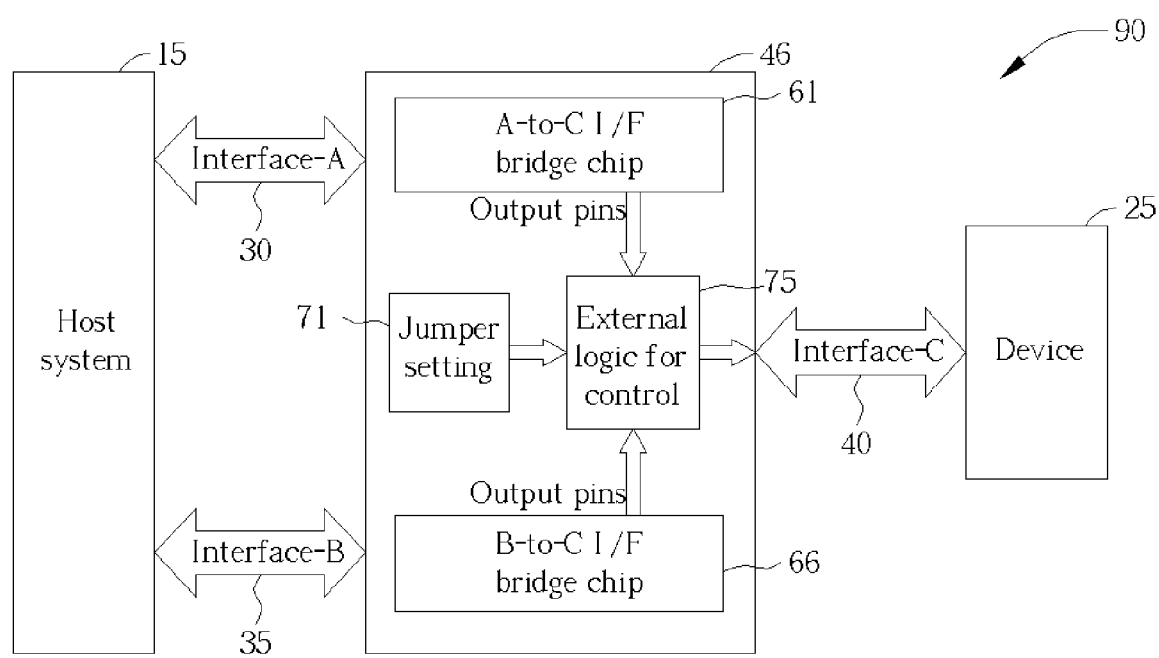
FIG. 3 is a functional block diagram of another conventional Host-Bridge-Device system that utilizes a multiple bridge.
Figure 4:
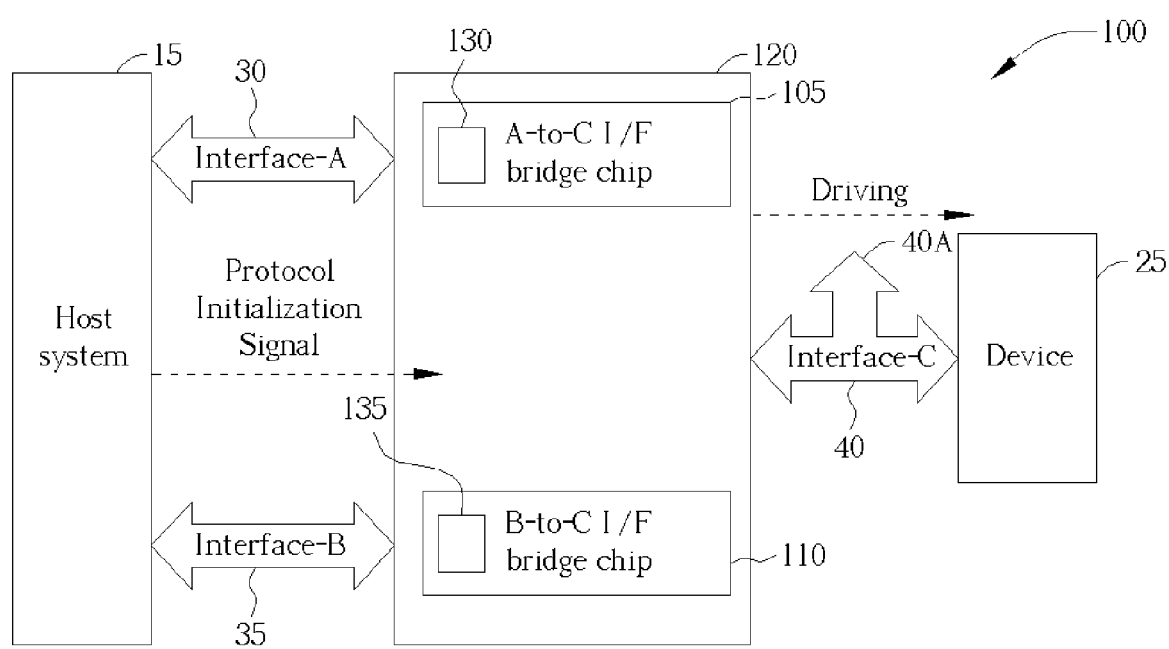
FIG. 4 is a functional block diagram of a multiple bridge system according to the present invention.

FIG. 4 is a functional block diagram of a Host-Bridge-Device system 100 according to the present invention. Where the components and functionality of the components are the same as depicted in FIGS. 1-3, the original reference numbers have been maintained for clarity.

The system 100 comprises a host computer system 15, a bridge 120, and a device 25. A first bus interface 30 connects the host system 15 with the bridge 120 and allows communications between the host 15 and the bridge 120 according to a first communications protocol A. A second bus interface 35 connects the host system 15 with the bridge 120 and allows communications between the host 15 and the bridge 120 according to a second communications protocol B. A device bus interface 40 connects the bridge 120 with the device 25 and allows communications between the bridge 120 and the device 25 according to a third communications protocol C. Since all of the bridge chips are automatically disabled after a power-on or hardware reset, the device interface bus 40 is not driven by any of the bridge chips and thus is still available for connection with host. Thus, the device 25 possibly may also be connected directly to the host system 15, bypassing the bridge 120, via the connection 40A that utilizes the device bus interface 40 (the original device interface).

The bridge 120 comprises at least one bridge chip and may comprise two or more bridge chips 105 and 110 (as shown in FIG. 4) to control the operations of the bridge 120. The bridge chips 105 and 110 may be disposed on a PCB board also comprised by the bridge 120. The bridge chip 105 may be electrically connected to the first bus interface 30 and allow communications between the host system 15 and the device 25 when the first bus interface 30 is to be utilized. The bridge chip 110 may be electrically connected to the second bus interface 35 and allow communications between the host system 15 and the device 25 when the second bus interface 35 is to be utilized. Both of the bridge chips 105 and 110 may also be connected to the device bus interface 40 to complete the host system 15 to device 25 connections.

It is important to note that the bridge 120 does not require either an additional function pin or a control circuit for enabling/disabling the bridge chips 105 and 110. Instead, each of the bridge chips 105 and 110 respectively comprise an activation circuit 130 and 135. The activation circuit 130 is capable of disabling the bridge chip 105 after a power-on, a hardware reset, or a physical disconnection from the host 15. The activation circuit 130 is also capable of enabling the bridge chip 105 when the activation circuit 130 receives a first predetermined protocol initialization signal. Similarly, the activation circuit 135 is capable of disabling the bridge chip 110 after a power-on, a hardware reset, or a physical disconnection from the host 15. The activation circuit 135 is also capable of enabling the bridge chip 110 when the activation circuit 135 receives a second predetermined protocol initialization signal.

The preferred operation of the activation circuits 130 and 135 is as follows. After a power-on or a hardware reset, each activation circuit 130 and 135 sets the corresponding bridge chip 105 or 110 to be disabled with all of the pins connecting the bridge chips 105 and 110 to the device bus interface 40 set to floating. In this situation, neither one of the bridge chips 105 or 110 controls the device bus interface 40. However, when a device bus interface 40A exists, the device can still be used via the device bus interface 40A if desired because neither of the bridge chips 105 or 110 are necessary to support this arrangement. Both of the bridge chips 105 and 110 remain disabled until either the first or the second predetermined protocol initialization signal is received by one of the activation circuits 130 or 135.

If the activation circuit 130 of the bridge chip 105 receives the first predetermined protocol initialization signal, the activation circuit 130 sets the bridge chip 105 to be enabled. Once enabled, the bridge chip 105 drives all of the pins in the device bus interface 40, taking control of the device bus interface 40. Once the bridge chip 105 has taken control of the device bus interface 40, the bridge chip 105 remains in control of the device bus interface 40 until the bridge chip 105 has been physically disconnected with host 15, a power-off occurs, or a hardware reset occurs.

On the other hand, if the activation circuit 135 of the bridge chip 110 receives the second predetermined protocol initialization signal, the activation circuit 135 sets the bridge chip 110 to be enabled. Once enabled, the bridge chip 110 drives all of the pins in the device bus interface 40, taking control of the device bus interface 40. Once the bridge chip 110 has taken control of the device bus interface 40, the bridge chip 110 remains in control of the device bus interface 40 until the bridge chip 110 has been physically disconnected with host, a power-off occurs, or a hardware reset occurs.

Note that only the bridge chip 105 or 110 that received a protocol initialization signal becomes enabled and takes control of the device bus interface 40. The bridge chip that did not receive a protocol initialization signal remains disabled. Additionally, control of the device bus interface 40 by one or the other of the bridge chips 105 and 110 effectively disables the option of utilizing the device bus interface 40A.

In practice, the activation circuits 105 and 135 may be separate but identical, as long as each activation circuit corresponds to one and only one bridge chip 105 or 110. The activation circuits 130 and 135 may easily be implemented by a minor change in hardware comprised by the respective bridge chip 105 or 110. Possible modifications include having the bridge chip disabled by default and having an enabled flag and/or a switch that enables the bridge chip when a protocol initialization signal is received by the bridge chip.

In the preferred embodiment of the present invention, a protocol initialization signal is transmitted by the host system 15 to the activation circuit 130 or 135 over the first bus interface 30 or the second bus interface 35 connecting the host system 15 with the bridge 120. The protocol initialization signal may be a signal showing that a physical connection between host system 15 and bridge 120 has been built, a signal from the host system 15 to reset the bridge 120 or device 25, a signal from the host system 15 to initialize the bridge 120 or device 25, or a signal from the host system 15 to acknowledge the existence of the bridge 120 or device 25.

In the present invention, the activation circuit automatically disables each bridge chip after a power-on, a hardware reset occurs, or when the bridge chip has been physically disconnected from the host. The device bus interface 40A, if one exists, may be used in this condition. If an activation circuit associated with a particular bridge chip receives a predetermined protocol initialization signal, the activation circuit causes the associated bridge chip, and only the associated bridge chip, to become enabled. An enabled bridge chip controls the device bus interface until the enabled bridge chip has been physically disconnected with host, a power-off occurs, or a hardware reset occurs.

It should be obvious that although the above description of a multiple bridge system refers to two bridge chips and two bus interfaces between the host system and the bridge, other quantities of bridge chips and bus interfaces also fall within the intended scope of this disclosure. The intent of the present invention is to allow the use of a bridge system having at least one bridge chip to function properly without the need of a function pin requiring physical placement/replacement and without the expense, size, and complexity of a control circuit. This functionality is provided in the present invention by the activation circuit and the protocol initialization signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bridge for a Host-Bridge-Device system, the bridge comprising:
    a device bus interface for coupling a device to the bridge utilizing a first communications protocol;
    a plurality of host bus interfaces for coupling the bridge to a host system utilizing a plurality of communications protocols;
    a plurality of bridge chips, each bridge chip coupled to the device bus interface and to a respective host bus interface of the plurality of host bus interfaces, and for communicating between the first communications protocol of the device bus interface and a communications protocol of the respective host bus interface being coupled to the bridge chip; and
    a plurality of activation circuits, each activation circuit corresponding to a bridge chip and being for disabling the corresponding bridge chip until a predetenmiried protocol initialization signal sent by the host system is received by the activation circuit, and further for enabling the corresponding bridge chip to control the device bus interface upon reception of the predetermined protocol initialization signal sent by the host system when all the bridge chips are disabled.

2. The bridge of claim 1 wherein the activation circuits are further for disabling all of the bridge chips when a hardware reset occurs so that none of the bridge chips control the deviec bus interface.

3. The bridge of claim 2 wherein the activation circuits are further for disabling all of the bridge chips after a power on occurs so that none of the bridge chips controls the device bus interface.

4. The bridge of claim 1 wherein once a particular bridge chip is enabled, the activation circuits are for allowing only the particular bridge chip to remain enabled and in control of the device bus interface until a hardware reset occurs.

5. The bridge of claim 1 wherein the predetermined protocol initialization signal is a reset signal sent by the host system to reset the bridge or the device coupled to the bridge.

6. The bridge of claim 1 wherein the predetermined protocol initialization signal is an initialization signal sent by the host system to initialize the bridge or the device coupled to the bridge.

7. The bridge of claim 1 wherein when the plurality of bridge chips are disabled the device bus interface is set to float.

8. The bridge of claim 7 wherein the device bus interface is coupled to an external host system, and when the plurality of bridge chips are disabled the external host system is for controlling the device through the device bus interface.

9. The bridge of claim 1 wherein the activation circuits are for enabling at most one of the bridge chips to control the device bus interface.

10. The bridge of claim 1 wherein once a particular bridge chip is enabled, the activation circuits are for allowing only the particular bridge chip to remain enabled and in control of the device bus interface until the host system has been disconnected from the bridge.

11. A method for bridging a device utilizing a first communications protocol with a host system, the method comprising:
    coupling the device utilizing the first communications protocol to a bridge through a device bus interface;
    coupling the bridge to a host system utilizing a plurality of communications protocols through a plurality of host bus interfaces;
    providing a plurality of bridge chips within the bridge, each bridge chip coupled to the device bus interface and to a respective host bus interface of the plurality of host bus interfaces;
    communicating between the first communications protocol of the device bus interface and a communications protocol of the respective host bus interface being coupled to the bridge chip utilizing each bridge chip;
    providing a plurality of activation circuits, each activation circuit corresponding to a bridge chip;
    disabling the bridge chips until a predetermined protocol initialization signal sent by the host system is received by a particular activation circuit; and
    when all the bridge chips are disabled, enabling a bridge chip corresponding to the particular activation circuit to control the device bus interface upon reception by the particular activation circuit of the predetermined protocol initialization signal.

12. The method of claim 11 further comprising disabling all of the bridge chips when a hardware reset occurs so that none of the bridge chips control the device bus interface.

13. The method of claim 12 further comprising disabling all of the bridge chips after a power on occurs so that none of the bridge chips controls the device bus interface.

14. The method of claim 11 further comprising once a particular bridge chip is enabled, allowing only the particular bridge chip to remain enabled and in control of the device bus interface until a hardware reset occurs.

15. The method of claim 11 wherein the predetermined protocol initialization signal is a reset signal sent by the host system to reset the bridge or the device coupled to the bridge.

16. The method of claim 11 wherein the predetermined protocol initialization signal is an initialization signal sent by the host system to initialize the bridge or the device coupled to the bridge.

17. The method of claim 11 further comprising setting the device bus interface to float when the plurality of bridge chips are disabled.

18. The method of claim 17 further comprising coupling the device bus interface to an external host system, and controlling the device through the device bus interface utilizing the external host system when the plurality of bridge chips are disabled.

19. The method of claim 11 further comprising enabling at most one of the bridge chips to control the device bus interface.

20. The method of claim 11 further comprising once a particular bridge chip is enabled, allowing only the particular bridge chip to remain enabled and in control of the device bus interface until the host system has been disconnected from the bridge.

* * * * *